US008811726B2

(12) United States Patent
Belhumeur et al.

(10) Patent No.: US 8,811,726 B2
(45) Date of Patent: Aug. 19, 2014

(54) METHOD AND SYSTEM FOR LOCALIZING PARTS OF AN OBJECT IN AN IMAGE FOR COMPUTER VISION APPLICATIONS

(75) Inventors: Peter N. Belhumeur, New York, NY (US); David W. Jacobs, Bethesda, MD (US); David J. Kriegman, San Diego, CA (US); Neeraj Kumar, Seattle, WA (US)

(73) Assignee: Kriegman-Belhumeur Vision Technologies, LLC, San Diego, CA (US)

( * ) Notice: Subject to any disclaimer, the term of this patent is extended or adjusted under 35 U.S.C. 154(b) by 70 days.

(21) Appl. No.: 13/488,415

(22) Filed: Jun. 4, 2012

(65) Prior Publication Data

US 2012/0308124 A1    Dec. 6, 2012

Related U.S. Application Data

(60) Provisional application No. 61/492,774, filed on Jun. 2, 2011.

(51) Int. Cl.
*G06K 9/62* (2006.01)
*G06K 9/00* (2006.01)

(52) U.S. Cl.
CPC .......... *G06K 9/6278* (2013.01); *G06K 9/00281* (2013.01); *G06K 9/62* (2013.01)
USPC ........... 382/159; 382/103; 382/118; 382/154; 382/224

(58) Field of Classification Search
CPC . G06K 9/00228; G06K 9/00275; G06K 9/46; G06K 9/00201; G06K 9/6297; G06K 9/6209; G06K 9/6256; G06K 9/6278; G06K 9/00281; G06K 9/00785; G06T 2207/20081; G06T 7/0087; H04L 41/142; H04L 41/5096; G06F 17/30905; Y10S 707/99943; G06Q 30/0254; G06N 7/005
USPC .......................... 382/103, 118, 154, 159, 224
See application file for complete search history.

(56) References Cited

U.S. PATENT DOCUMENTS 6,128,398 A * 10/2000 Kuperstein et al. ........... 382/118
6,665,687 B1 * 12/2003 Burke .................................. 1/1
(Continued)

OTHER PUBLICATIONS

Bourdev, L. et al. Poselets: body part detectors trained using 3d human pose variations, in IEEE Conference on Computer Vision and Pattern Recognition, pp. 1365-1372, 2009.

(Continued)

*Primary Examiner* — Vu Le
*Assistant Examiner* — Aklilu Woldemariam
(74) *Attorney, Agent, or Firm* — Eleanor M. Musick; Procopio, Cory, Hargreaves & Savitch LLP

(57) ABSTRACT

A method is provided for localizing parts of an object in an image by training local detectors using labeled image exemplars with fiducial points corresponding to parts within the image. Each local detector generates a detector score corresponding to the likelihood that a desired part is located at a given location within the image exemplar. A non-parametric global model of the locations of the fiducial points is generated for each of at least a portion of the image exemplars. An input image is analyzed using the trained local detectors, and a Bayesian objective function is derived for the input image from the non-parametric model and detector scores. The Bayesian objective function is optimized using a consensus of global models, and an output is generated with locations of the fiducial points labeled within the object in the image.

31 Claims, 9 Drawing Sheets

(56) References Cited

U.S. PATENT DOCUMENTS

| | | | |
|---|---|---|---|
| 7,280,697 B2* | 10/2007 | Perona et al. | 382/225 |
| 7,894,664 B2* | 2/2011 | Kerwin et al. | 382/155 |
| 8,688,720 B1* | 4/2014 | Harik et al. | 707/755 |
| 2006/0067573 A1* | 3/2006 | Parr et al. | 382/154 |
| 2006/0285747 A1* | 12/2006 | Blake et al. | 382/180 |
| 2007/0104362 A1* | 5/2007 | Hwang et al. | 382/159 |
| 2007/0112585 A1* | 5/2007 | Breiter et al. | 705/2 |
| 2007/0258648 A1* | 11/2007 | Perronnin | 382/224 |
| 2009/0097711 A1* | 4/2009 | Chen et al. | 382/103 |
| 2010/0020208 A1* | 1/2010 | Barbu | 348/250 |
| 2010/0220922 A1* | 9/2010 | Okada | 382/159 |
| 2012/0075331 A1 | 3/2012 | Mallick et al. | |

OTHER PUBLICATIONS

Burl, M. et al. Face localization via shape statistics, Workshop on Automatic Face and Gesture Recognition, 6 pages, 1995.

Campadelli, P. et al. Automatic facial feature extraction for face recognition, Face Recognition, I-Tech Education and Publishing, 8 pages, 2007.

Cristinacce, D. et al. Feature detection and tracking with constrained local models, British Machine Vision Conference (BMVC), pp. 929-938, 2006.

Cristinacce, D. et al., A multi-stage approach to facial feature detection, British Machine Vision Conference (BMVC), pp. 231-240, 2004.

Ding, L. et al. Precise detailed detection of faces and facial features, IEEE Computer Vision and Pattern Recognition (CVPR), 7 pages, 2008.

Eckhardt, M. et al. Towards practical facial feature detection, Int. J. of Pattern Recognition and Artificial Intelligence, 23(3): 379-400, 2009.

Everingham, M. et al. Hello! My name is . . . Buffy—automatic naming of characters in TV video, British Machine Vision Conference (BMVC), 10 pages, 2006.

Gourier, N. et al. Facial features detection robust to pose, illumination and identify, Int. Conf. on Systems, Man and Cybernetics, 7 pages, 2004.

Gu, L. et al. A generative shape regularization model for robust face alignment, European Conference on Computer Vision (ECCV), pp. 413-426, 2008.

Holden, E. et al. Automatic facial point detection, Asian Conf. Computer Vision, pp. 731-736, 2002.

Jesorsky, O. Robust face detection using the Hausdorff distance, Conf. on Audio- and Video-Based Biometric Person Authentication, pp. 90-95, Springer, 2001.

Kumar, N. et al. Attribute and simile classifiers for face verification, IEEE International Conference on Computer Vision, 8 pages, 2009.

Leibe, B. et al. Learning semantic object parts for object categorization, Image and Vision Computing, 26, pp. 15-16, 1998.

Lowe, D. Distinctive image features from scale-invariant keypoints, Intl. Journal of Computer Vision, 20 pages, 2003.

Milborrow, S. et al. Locating facial features with an extended active shape model, European Conf. on Computer Vision, pp. 504-513, 2008.

Reinders, M. et al. Locating facial features in image sequences using neural networks, Conf. on Automatic Face and Gesture Recognition, pp. 230-235, 1997.

Saragih, J.M. et al. Face alignment through subspace contrained mean-shifts, International Conference of Computer Vision (ICCV), 8 pages, Sep. 2009.

Valstar, M. et al. Facial point detection using boosted regression and graph models, IEEE Computer Vision and Pattern Recognition (CVPR), pp. 2729-2736, 2010.

Viola, P. et al. Robust real-time face detection, Intl. Journal of Computer Vision, vol. 57, pp. 137-154, 2004.

Vukadinovic, D. et al. Fully automatic facial feature point detection using Gabor feature based boosted classifiers, Int. Conf. on Systems, Man and Cybernetics, pp. 1692-1698, 2005.

Yang, M.-H. et al. Detecting faces in images: A survey, IEEE Trans. On Pattern Analysis and Machine Intelligence, vol. 24(1), pp. 34-58, 2002.

* cited by examiner

METHOD AND SYSTEM FOR LOCALIZING PARTS OF AN OBJECT IN AN IMAGE FOR COMPUTER VISION APPLICATIONS

GOVERNMENT RIGHTS

This invention was made with government funding from the Office of the Chief Scientist of the Central Intelligence Agency. The government has certain rights in the invention.

RELATED APPLICATIONS

This application claims the benefit of the priority of U.S. provisional application No. 61/492,774, filed Jun. 2, 2011, which is incorporated herein by reference in its entirety.

FIELD OF THE INVENTION

The present invention relates to a method for computer-aided analysis of images, and more specifically to a method for localizing features within an image.

BACKGROUND OF THE INVENTION

Over the last decade, new applications in computer vision and computational photography have arisen due to earlier advances in methods for detecting human faces in images. These applications include face detection-based autofocus and white balancing in cameras, smile and blink detection, new methods for sorting and retrieving images in digital photo management software, obscuration of facial identity in digital photos, facial expression recognition, virtual try-on, product recommendations, facial performance capture, avatars, controls, image editing software tailored for faces, and systems for automatic face recognition and verification.

The first step of any face processing system is the detection of locations in the images where faces are present. However, face detection from a single image is challenging because of variability in scale, location, orientation, and pose. Facial expression, occlusion, and lighting conditions also change the overall appearance of faces.

Given an arbitrary image, the goal of face detection is to determine whether or not there are any faces in the image and, if present, return the image location and extent of each face. The challenges associated with face detection can be attributed to the following factors:

Pose: The images of a face vary due to the relative camera-face pose (frontal, 45 degree, profile, upside-down), and some facial features such as an eye or the nose may become partially or wholly occluded.

Presence or absence of structural components: Facial features such as beards, moustaches, and glasses may or may not be present, and there is a great deal of variability among these components including shape, color, and size.

Facial expression: The appearance of faces is directly affected by a person's facial expression.

Occlusion: Faces may be partially occluded by other objects. In an image with a group of people, some faces may partially occlude other faces.

Image orientation: Face images vary directly for different rotations about the camera's optical axis.

Imaging conditions: When the image is formed, factors such as lighting (spectra, source distribution and intensity) and camera characteristics (sensor response, lenses, filters) affect the appearance of a face.

Camera Settings: The settings on the camera and the way that is used can affect the image focus blur, motion blur, depth of field, compression (e.g., jpeg) artifacts, and image noise.

Face detectors usually return the image location of a rectangular bounding box containing a face—this serves as the starting point for processing the image. A part of the process that is currently in need of improvement is the accurate detection and localization of parts of the face, e.g., eyebrow corners, eye corners, tip of the nose, ear lobes, hair part, jawline, mouth corners, chin, etc. These parts are often referred to as facial feature points or "fiducial points". Unlike general interest or corner points, the fiducial point locations may not correspond to image locations with high gradients (e.g., tip of the nose). As a result, their detection may require larger image support.

A number of approaches have been reported which have demonstrated great accuracy in localizing parts in mostly frontal images, and often in controlled settings. Early work on facial feature detection was often described as a component of a larger face processing task. For example, Burl, et al. take a bottom-up approach to face detection, first detecting candidate facial features over the whole image, then selecting the most face-like constellation using a statistical model of the distances between pairs of features. Other works detect large-scale facial parts such as each eye, the nose, and the mouth and return a contour or bounding box around these components.

There is a long history of part-based object descriptions in computer vision and perceptual psychology. Recent approaches have shown a renewed emphasis on parts-based descriptions and attributes because one can learn descriptions of individual parts and then compose them, generalizing to an exponential number of combinations. The Poselets work by Bourdev and Malik, incorporated herein by reference, describes a data-driven search for object parts that may be a useful approach for addressing some of the described inadequacies of the prior art in order to achieve precise face detection in uncontrolled image conditions.

Many fiducial point detectors include classifiers that are trained to respond to a specific fiducial (e.g., left corner of the left eye). These classifiers take as input raw pixel intensities over a window or the output of a bank of filters (Gaussian Derivative filters, Gabor filters, or Haar-like features). These local detectors are scanned over a portion of the image and may return one or more candidate locations for the part or a "score" at each location. This local detector is often a binary classifier (feature or not-feature). For example, the Viola-Jones style detector, which uses an image representation called an "integral image" rather than working directly with image intensities, has been applied to facial features. False detections occur often, even for well-trained classifiers, because portions of the image have the appearance of a fiducial under some imaging condition. For example, a common error is for a "left corner of left eye" detector to respond to the left corner of the right eye. Eckhart, et al. achieve robustness and handle greater pose variation by using a large area of support for the detector covering, e.g., an entire eye or the nose with room to spare. Searching over a smaller region that includes the actual part location reduces the chance of false detections with minimal impact of missing fiducials. While this may be somewhat effective for frontal fiducial point detection, the location of a part within the face detector box can vary significantly when the head rotates in three-dimensions. For example, while the left eye is in the upper-left side of the box when frontal, it can move to the right side when the face is seen in profile.

To better handle larger variations in pose, constraints can be established about the relative location of parts with respect to each other rather than the actual location of each part to the detector box. This can be expressed as predicted locations, bounding regions, or as a conditional probability distribution of one part location given another location. Alternatively, the joint probability distribution of all the parts can be used, and one model is that they form a multivariate normal distribution whose mean is the average location of each part. This is the model underlying Active Appearance Models and Active Shape Models, which have been used for facial feature point detection in near frontal images. Saragih, et al. extend this to use a Gaussian Mixture Model, whereas Everingham, et al. handle a wider range of pose, lighting and expression variations by modeling the joint probability of the location of nine fiducials relative to the bounding box with a mixture of Gaussian trees. As pointed out in this work, a joint distribution of part locations over a wide range of poses cannot be adequately modeled by a single Gaussian.

While a number of approaches balance local feature detector responses on the image with prior global information about the feature configurations, optimizing the resulting objective function remains a challenge. The locations of some parts vary significantly with expression (e.g., the mouth, eyebrows) whereas others, such as the eye corners and nose, are more stable. Consequently, some detection methods organize their search to first identify the stable points. The location of the mouth points are then constrained, possibly through a conditional probability, by the locations of stable points. However, this approach fails when these stable points cannot be reliably detected, for example, when the eyes are hidden by sunglasses.

The need for the ability to reliably detect and identify features within an image is not limited to human facial recognition. Many other disciplines rely on specific features within an image to facilitate identification of an object within an image. For example, conservation organizations utilize markings such as ear notches, scars, tail patterns, etc., on wild animals for identification of individual animals for study of migration patterns, behavior and survival. The ability to reliably locate and identify the unique features within an image of an animal could provide expanded data for use in such studies. Other applications of image analysis that could benefit from improved feature location capability include identification of vehicles within images for military or law enforcement applications, and identification of structures in satellite images, to name a few.

SUMMARY OF THE INVENTION

According to the present invention, a method is provided for facial feature detection by combining the outputs of a plurality of local detectors with a consensus of non-parametric global models for part locations.

The inventive method for face detection begins with a large collection of pre-specified (labeled) parts in images of human faces taken under a variety of acquisition conditions, including variability in pose, lighting, expression, hairstyle, subject age, subject ethnicity, partial-occlusion of the face, camera type, image compression, resolution, and focus. This collection captures both the variability of appearance of each part and the variability in the relative positions of each part.

The collection of labeled exemplar images is used as a training set for a local detector, which evaluates small windows in the image to determine whether the area within the window contains the desired part. Using scale-invariant features within the image, the local detector, which is a sliding window classifier, generates a detector score for each point in the image, with the score corresponding to the likelihood that the desired part is located at a given point in the image. The sliding window classifier may be a neural network, support vector machine (SVM), Viola-Jones-style detector, or other learning machine that is appropriate for image analysis applications. The sliding window classifier may be applied over the expected range of image locations for the particular part. Next, a global detector is developed for a collection of fiducial points by combining the outputs of the local detectors with a non-parametric prior model of face shape. By assuming that global model images generate the part locations as hidden variables, a Bayesian objective function can be derived. This function is optimized using a consensus of models for the hidden variables to determine the most likely values of the hidden variables from which the part location can be determined.

In a Bayesian sense, a generative probabilistic model $P_i(W)$ for the i-th fiducial can be constructed—this is the probability distribution of the image feature W from the marked fiducials in the collection. Letting $X=\{x^1, x^2, \ldots x^n\}$ denote the locations of the n fiducials, the prior probability distribution of the fiducial location P(X) can be estimated from the fiducial locations in the image collection. Detection of the parts in an input image can use the probabilistic models on the appearance $P_i(W)$ and fiducial locations P(X) to find the fiducial locations in an input image by maximizing a Bayesian objective function. Alternatively, image features that are not at the locations of the fiducials (negative examples) and the features at the locations of fiducials (positive examples used to construct $P_i(W)$) can be used to construct classifiers or regressors for each fiducial. These classifier outputs can be combined using the prior model on fiducial location P(X) to detect fiducials in an input image. Existing methods for detecting parts in faces that create a prior model on the configuration of fiducials have used parametric forms for P(X) such as a multivariate normal distribution or a mixture of Gaussian, whereas the inventive method uses a non-parametric form that is dictated by the training collection.

In one aspect of the invention, the facial feature localization method is formulated as a Bayesian inference that combines the output of local detectors with a prior model of face shape. The prior on the configuration of face parts is non-parametric, making use of a large collection of diverse, labeled exemplars. Hidden (latent) variables are introduced for the identity and parts locations within the exemplar to generate fiducial locations in a new image. The hidden variables are marginalized out, but they nonetheless provide valuable conditional independencies between different parts. To marginalize efficiently, a RANdom SAmple Consensus (RANSAC)-like process to sample likely values of the hidden variables. This ultimately leads to part localization as a combination of local detector output and the consensus of a variety of exemplars and poses that fit this data well.

In another aspect of the invention, a method for localizing parts of an object in an input image comprises training a plurality of local detectors using at least a portion of a plurality of image exemplars as training images, wherein each image exemplar is labeled with fiducial points corresponding to parts within the image, and wherein each local detector generates a detector score when applied at one location of a plurality of locations of fiducial points in the training images corresponding to a likelihood that a desired part is located at the location within the training image; generating a plurality of non-parametric global models using at least a portion of the plurality of image exemplars; inputting data corresponding to the input image; applying the trained local detectors to the input image to generate detector scores for the input image; deriving a Bayesian objective function from the plurality of non-parametric global models using an assumption that locations of fiducial points within the image exemplar are represented within its corresponding global model as hidden variables; optimizing the Bayesian objective function to obtain a consensus set of global models for the hidden variables that best fits the data corresponding to the input image; and generating an output comprising locations of the fiducial points within the object in the image. In one embodiment, the object is a face.

In another aspect of the invention, a method for localizing parts of an object in an input image comprises training a plurality of local detectors using at least a portion of a plurality of image exemplars as training images, wherein each image exemplar is labeled with fiducial points corresponding to parts within the image, and wherein each local detector generates a detector score when applied at one location of a plurality of locations of fiducial points in the training images corresponding to a likelihood that a desired part is located at the location within the training image; generating a non-parametric model of the plurality of locations of the fiducial points in each of at least a portion of the plurality of image exemplars; inputting data corresponding to the input image; applying the trained local detectors to the input image to generate detector scores for the input image; deriving a Bayesian objective function for the input image from the non-parametric model and detector scores; and generating an output comprising locations of the fiducial points within the object in the image. In one embodiment, the step of deriving a Bayesian objective function comprises using an assumption that locations of fiducial points within the image exemplar are represented within its corresponding global model as hidden variables; and optimizing the Bayesian objective function to obtain a consensus set of global models for the hidden variables that best fits the data corresponding to the image.

In still another aspect of the invention, a computer-program product embodied on a non-transitory computer-readable medium comprising instructions for receiving a plurality of image exemplars, and further comprises instructions for training a plurality of local detectors using at least a portion of a plurality of image exemplars as training images, wherein each image exemplar is labeled with fiducial points corresponding to parts within the image, and wherein each local detector generates a detector score when applied at one location of a plurality of locations of fiducial points in the training images corresponding to a likelihood that a desired part is located at the location within the training image; generating a non-parametric model of the plurality of locations of the fiducial points in each of at least a portion of the plurality of image exemplars; inputting data corresponding to the input image; applying the trained local detectors to the input image to generate detector scores for the input image; deriving a Bayesian objective function for the input image from the non-parametric model and detector scores; and generating an output comprising locations of the fiducial points within the object in the image. In an exemplary embodiment, deriving a Bayesian objective function comprises using an assumption that locations of fiducial points within the image exemplar are represented within its corresponding global model as hidden variables; and optimizing the Bayesian objective function to obtain a consensus set of global models for the hidden variables that best fits the data corresponding to the image.

DETAILED DESCRIPTION

A method is provided for localizing parts of an object within an image by detecting fine-scale fiducial points or microfeatures. Although the examples described herein relate to detecting parts of a human face, the inventive method may be used for detecting parts within images of many other classes of objects, e.g., animals (dogs, cats, wild animals, marine mammals, etc.) or animal faces, parts of bicycles, vehicles, or structures. Thus, the described examples of face part detection are not intended to be limiting.

Figure 1:
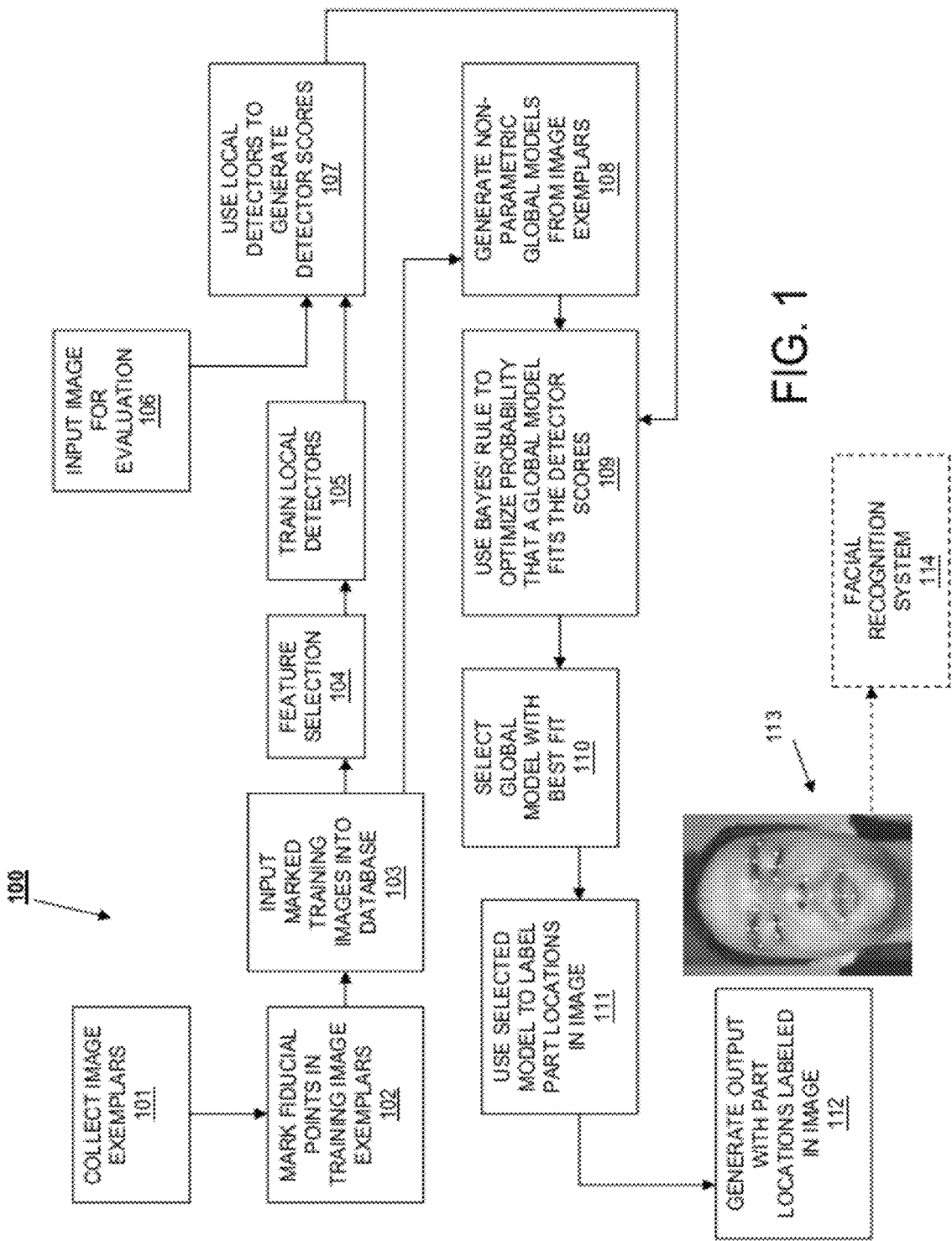
FIG. 1 is a block diagram showing the steps of the inventive process for localizing parts of a face.
Figure 2:
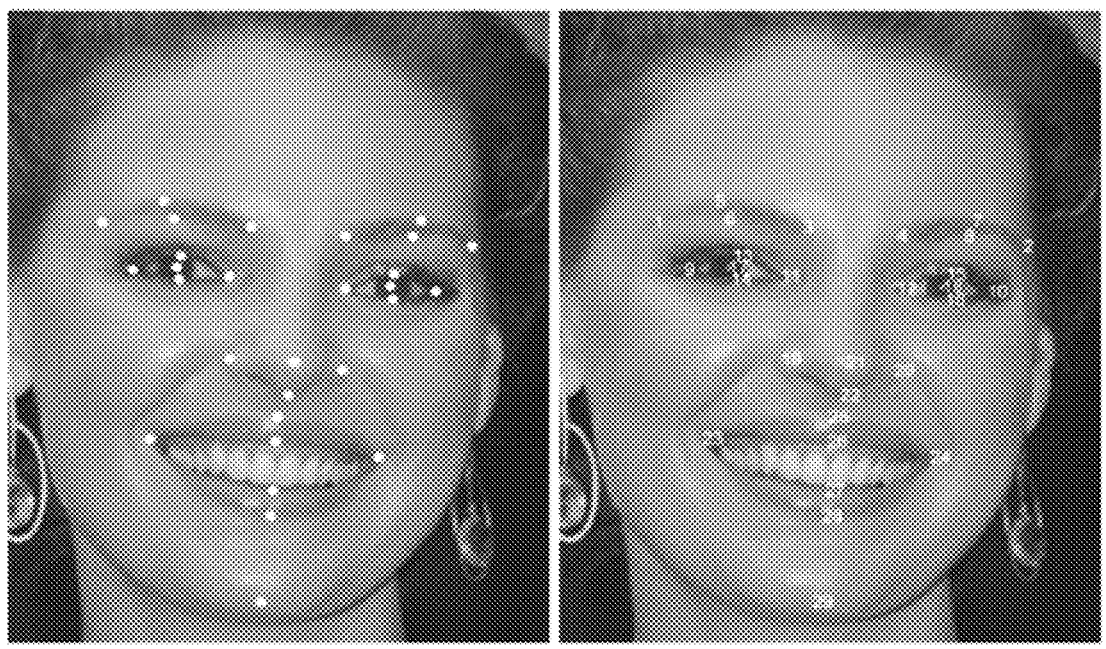
FIG. 2 is an image of a human face in the LFPW dataset, where the left image shows hand-labeled fiducial points and the right image shows the points numbered to match FIG. 4

FIG. 1 provides the basic steps of the inventive method 100. In step 101, a large number of image exemplars are collected, preferably without constraint as to pose, expression, occlusion or other characteristics that would make the detection process easier. In step 102, the image exemplars are marked by hand with fiducial points. Examples of these fiducial points are shown in FIG. 2, overlaid on an image obtained from the Internet. In addition to the marked fiducials, a virtual fiducial location in each training image can be defined as a mathematical function of a subset of the marked fiducial. For example, a virtual fiducial in the center of the chin could be created by taking the average location of a fiducial located on the lower lip and a fiducial located on the chin.

In step 103, the marked image exemplars are downloaded into a database that can be accessed by a processor that is programmed to execute a learning machine.

The following steps are part of a computer program that may be embodied within a non-transitory computer-readable medium for causing a computer processor to execute the specified steps. (For purposes of the present invention, a "computer processor" includes a supercomputing grid or cluster, a network server, a private or dedicated server, a standard personal computer or laptop, a tablet computer, a smart phone, video game console or controller, digital camera, or any other known computing device (stand-alone or embedded within another electronic device) that is capable of processing images.) In step 104, an optional pre-processing or feature selection step, an algorithm is applied to select the features that are most determinative of the patterns to be recognized. In one example, known feature selection algorithms such as the well-known AdaBoost may be used to improve the performance of the subsequent classifiers. In another example, techniques for image feature detection and characterization, e.g., Hough transforms, edge detection, blob detection, histograms of Gradients (HOG), Speeded Up Robust Feature (SURF), and others, may be applied. As described below, in the preferred embodiment, a scale-invariant feature transform (SIFT) is used.

In step 105 local detectors are trained using the training images selected from the set of image exemplars and features extracted from the image. In the preferred embodiment, the classifier is a non-linear support vector machine (SVM) with a radial basis function (RBF) kernel. The local detectors return a score indicating the likelihood of an image location being a particular fiducial point. The local detector is scanned over an image and a score at each image location is computed; a high score is a more likely location in the image for the feature. The image locations that are local maxima of the detector output are referred to as "detector peaks."

In step 106, data for an image to be evaluated is input into the processor, and, in step 107, the trained local detectors are used to generate detector scores for each fiducial point type for each point in the image. Although not shown, the input image may require some pre-processing if the input image is more that just a face. In this case, a face detector may be applied to the image to identify a region of the image that contains a face, and this region would be the input to subsequent steps. For example, in a group photograph, or in a photograph where the subject is surrounded by structures or other background, a rectangle of an input image can be cropped out and used as the input for face part detection. The inventive method takes as input an image that contains a face. This optional face detector step can be bypassed when it is known that input contains only a single face at an approximately known or specified location, orientation, and size (e.g., head shots in a yearbook).

In step 108, a plurality of non-parametric global models is generated using the image exemplars. (Note that step 108 can follow either step 102 or step 103.) In step 109, the global models from step 108 and the detector scores from step 107 are combined. A Bayesian objective function is derived by assuming that the global models generate locations of the parts as hidden variables. This function is optimized using a consensus of global models for the hidden variables. The models that provide the best fit to the data are selected in step 110. In step 111, the selected set of best fitting models is used to label the part locations in the image that was input in step 106. An output is generated in step 112, where the image 113 may be stored in memory for further processing and/or displayed via a graphic display or printout at a user interface with the part locations (fiducial points) labeled, as shown in FIG. 2. Note that the dots shown in the image are used to indicate that the parts were correctly found and accurately located.

In optional step 114, the labeled output image 113 can be further processed using the same or a different processor programmed with facial recognition software to identify the individual whose face parts have been labeled by the inventive method. For such processing, the marked locations will be characterized as coordinates within the image, which will then be stored as an output. A face recognition system will use the coordinates corresponding to the fiducial locations along with the input image for performing the recognition procedure.

For purposes of this description, "facial features", "face parts", "facial landmarks" and "parts" may be used interchangeably to refer to a feature of a face. "Fiducial points" refers to the location within an image, commonly seen as a grid or array of pixels, at which the facial features, landmarks or parts may be found.

Figure 3:
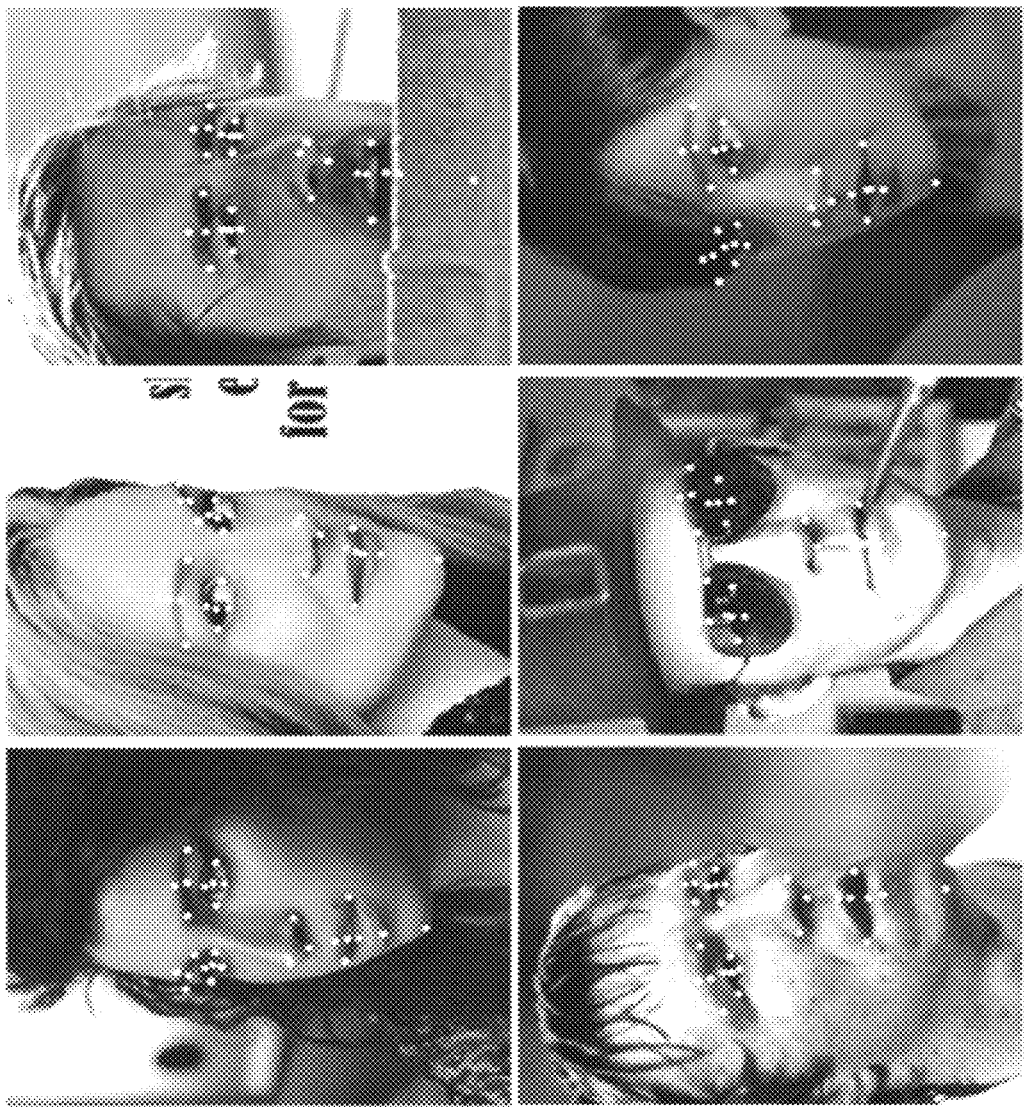
FIG. 3 is a set of photographs of human faces with fiducial points indicated according to the inventive method.
Figure 6:
FIG. 6 is a collection of photographic images from the Labeled Face Parts in the Wild (LFPW) along with parts located by the inventive detector.

The dataset used for training and testing the inventive method was a collection of face images acquired from internet search sites using simple text queries. More than a thousand images were hand-labeled to create the dataset, which is referred to as "Labeled Face Parts in the Wild", or "LFPW." A commercial, off-the-shelf (COTS) face detector was used to detect faces within the collected images. (No intentional filtering was applied to exclude poor quality images.) Unlike datasets that are acquired systematically in laboratories, there were few preconditions in the LFPW dataset that would tend to make detection easier. Rather, images were included where the eyes might be occluded by glasses, sunglasses, or hair; there may be heavy shadowing across features; the facial expression may be arbitrary; the face may have no makeup or be made up theatrically; the image may actually be an artistic rendering; the pose may be varied; there may be facial hair that occludes the fiducial points; and part of the face may be occluded by a hat, wall, cigarette, hand, or microphone. For example, FIGS. 3 and 6 illustrate a number of these conditions. As a result, this dataset stands in contrast to datasets such as FERET or BioID which have been used for evaluating fiducial point detection in that the images are not restricted to frontal faces or collected in a controlled manner, e.g., using the same camera for all images.

The inventive method consists of two basic processes. Given an input image containing a face, local detectors generate detector scores for points in the image, where the score provides an indication of the likelihood that a desired part is located at a given point within the image. The detector scores generated by the local detectors are then combined with a non-parametric prior model of a face shape.

For each local detector, a sliding window detector is scanned over a region of the image. The sliding window detectors may be a learning machine such as a neural network, linear or nonlinear support vector machine (SVM) or other learning machine. In a preferred embodiment, the detectors are SVM regressors with grayscale SIFT (Scale-Invariant Feature Transform) descriptors as features. The SIFT descriptor window may be computed at two scales: roughly ¼ and ½ the inter-ocular distance. These two SIFT descriptors are then concatenated to form a single 256 dimensional feature vector for the SVM regressor. In another embodiment, color SIFT is used to capture color variation of face parts. It will be recognized by practitioners with ordinary skill in the art that there are other feature descriptors besides SIFT that could be used including histograms of gradients (HOG), color histograms, SURF, ORB, Binary Robust Independent Elementary Features (BRIEF), etc. It will also be recognized by those of ordinary skill in the art that other regressors that are trained with positive and negative training examples and take a feature descriptor as input and return a score can be used.

For all of the training samples, the images were rescaled so that the faces have an inter-ocular distance of roughly 55 pixels. Positive samples are taken at the manually annotated part locations. Negative samples are taken at least ¼ of the inter-ocular distance away from the annotated locations. In addition, random image plane rotations within ±20° are used to synthesize additional training samples.

These local detectors return a score at each point x in the image (or in some smaller region of the face as inferred from an earlier face detection step). The detector score d(x) indicates the likelihood that the desired part is located at point x in the image. This score is normalized to behave like a probability by dividing by the sum of the scores in the detector window. Once normalized, this score is written as P(x|d), i.e., the probability that the fiducial is at location x given all the scores in the detection window.

As the local detectors are imperfect, the correct location will not always be at the location with the highest detector score. This can happen for many of the aforementioned reasons, including occlusions due to head pose and visual obstructions such as hair, glasses, hands, microphones, etc. These mistakes in the local detector almost always happen at places that are inconsistent with positions of the other, correctly detected fiducial points. Nonetheless, the global detectors can be built to better handle the cases where the local detectors are likely to go astray.

Although faces come in different shapes, present themselves to the camera in many ways, and may possess extreme facial expressions, there are strong anatomical and geometric constraints that govern the layout of face parts and their location in images. These constraints are not modeled explicitly, but rather the training data dictates this implicitly. All the part locations are taken together to develop a global detector for a collection of fiducial points. A global model encodes the configuration of part locations.

More formally, let $X=\{x^1, x^2, \ldots x^n\}$ denote the locations of n parts, where $x^i$ is the location of the $i^{th}$ part. Let $D=\{d^1, d^2, \ldots d^n\}$ denote the measured detector responses, where $d^i$ is the window of scores returned by the $i^{th}$ local detector. The goal is to find the value of X that maximizes the probability of X given the measurements from the local detectors, i.e., $$X^* = \arg\max_x P(X|D) \quad (1)$$

Let $X_k$ (where k=1, m) denote the locations of the n parts in the $k^{th}$ of m exemplars, and let $X_{k,t}$ be the locations of the parts in exemplar k transformed by some similarity transformation t. (Examples of similarity transformations include, but are not limited to, reflection, rotation, translation, etc.) $X_{k,t}$ is referred to as a "global model," while k and t are the "hidden variables."

Assuming that each X is generated by one of the global models $X_{k,t}$, P(X|D) can be expanded as follows:

$$P(X|D) = \sum_{k=1}^{m} \int_{t \in T} P(X|X_{k,t}, D) P(X_{k,t}|D) dt \quad (2)$$

where the collection of m exemplars $X_k$ along with similarity transformations t have been introduced into the calculation of P(X|D) and then marginalized out.

By conditioning on the global model $X_{k,t}$ the locations of the parts $x^i$ can now be treated as conditionally independent of one another and the first term of Eq. 2 can be rewritten as $$P(X|X_{k,t}, D) = \prod_{i=1}^{n} P(x^i | x_{k,t}^i, d^i) \quad (3)$$

$$= \prod_{i=1}^{n} \frac{P(x_{k,t}^i | x^i, d^i) P(x^i | d^i)}{P(x_{k,t}^i | d^i)} \quad (4)$$

Since knowing the true location of the parts trumps any information provided by the detector, $P(x_{k,t}^i | x^i, d^i) = P(x_{k,t}^i | x^i)$. Also, since the relation between the transformed model fiducial and the true fiducial is translationally invariant, it should only depend on $\Delta_{k,t}^i = x_{k,t}^i - x^i$. With these observations, Eq. 4 can be rewritten as $$P(X|X_{k,t}, D) = \prod_{i=1}^{n} \frac{P(\Delta x_{k,t}^i) P(x^i | d^i)}{P(x_{k,t}^i | d^i)}. \quad (5)$$

Moving to the second term in Eq. 2, Bayes' rule can be used to obtain $$P(X_{k,t}|D) = \frac{P(D|X_{k,t}) P(X_{k,t})}{P(D)} \quad (6)$$

$$= \frac{P(X_{k,t})}{P(D)} \prod_{i=1}^{n} P(d^i | x_{k,t}^i) \quad (7)$$

where again conditioning on the global model $X_{k,t}$ allows the detector responses $d^i$ to be treated as conditionally independent of one another.

A final application of Bayes' rule rewrites Eq. 7 as $$P(X_{k,t}|D) = \left[ \frac{P(X_{k,t})}{P(D)} \frac{\prod_{i=1}^{n} P(d^i)}{\prod_{i=1}^{n} P(x_{k,t}^i)} \right] \prod_{i=1}^{n} P(x_{k,t}^i | d^i) \quad (8)$$

$$= C \prod_{i=1}^{n} P(x_{k,t}^i | d^i) \quad (9)$$

Note that the terms within the square bracket in Eq. 8 that depend only on D are constant given the image. Also note that the terms within the square bracket that depend only on $X_{k,t}$ are also constant because a uniform distribution is assumed on the global models. This allows all the terms within the square bracket to be reduced to a single constant C.

Combining Eqs. 1, 2, 5 and 9 yields $$X^* = \arg\max_X \sum_{k=1}^{m} \int_{t \in T} \prod_{i=1}^{n} P(\Delta x_{k,t}^i) P(x^i | d^i) dt \quad (10)$$

where X* is the estimate for the part locations.

The first term $P(\Delta x_{k,t}^i)$ is taken to be a 2D Gaussian distribution centered at the model location $\Delta x_{k,t}^i$ though other probability distributions. Each part i has its own Gaussian distribution. These distributions model how well the part locations in the global model fit the true locations. If we had a large number of exemplars in our labeled dataset from which to construct these global models—i.e., if m were very large—one would expect a close fit and low variances for these distributions. The following steps are used to estimate the covariance matrices for the part locations:

For each exemplar X from the labeled dataset of image exemplars, a sample $X_k$ is obtained from the remaining exemplars and a transformation t that gives the best $L_2$ fit to $X_j$. Compute the difference $X_j - K_{k,t}$ and normalize the result by the inter-ocular distance. These normalized differences are used to compute the covariance matrices for each part location.

The second term $P(x^i|d^i)$ is computed as follows. Take the estimated location $x^i$ for part i and look up the response for the $i^{th}$ detector at that point in the image, i.e., $d^i(x^i)$. This value is then normalized to behave like a probability by dividing by the sum of $d^i(x)$ for all x in the detector window.

Computing the sum and integral in Eq. 10 is challenging, as they are taken over all global models k and all similarity transformations t. However, as noted from Eq. 2, if $P(X_{k,t}|D)$ is very small for a given k and t, it will be unlikely to contribute much to the overall sum and integration. Thus, the strategy is to consider only those global models k with transformations t for which $P(X_{k,t}|D)$ is large.

In a sense, one performs a Monte Carlo integration of Eq. 10 where the global models $X_{k,t}$ chosen are those that are likely to contribute to the sum and integral. In the following, the process is described for selecting a list of k and t that are used to compute this integration.

The goal is to optimize $P(X_{k,t}|D)$ over the unknowns k and t. This optimization is non-linear, and not amenable to gradient descent-type algorithms. First, k is a discrete variable with a large number of possible values. Second, even for a fixed k, different values of t can be expected to produce large numbers of local optima because the fiducial detectors usually produce a multi-modal output. Transformations that align a model with any subsets of these modes are likely to produce local optima in the optimization function.

To address this issue, a generate-and-test approach similar to RANSAC (RANdom SAmple Consensus) can be used by generating a large number of plausible values for the hidden variables k and t. Each of these values is evaluated using Eq. 9, keeping track of the m* best global models, i.e., the m* best pairs k and t. This is done in the following steps:
1. Select a random k.
2. Select two random parts. Randomly match each model part to one of the g highest peaks of the detector output (i.e., highest detector scores) for that part.
3. Set t to be the similarity transformation that aligns the two model fiducial points with two matching peaks from Step 2.
4. Evaluate Eq. 9 for this k,t.
5. Repeat Steps 1 to 4 r times.
6. Record in a set $\mathcal{M}$ the m* pairs k and t for which Eq. 9 in Step 4 is largest.

In the experimental system, the values r=10,000, g=2, and m*=100 were used.

Estimating X

In the previous subsection, a RANSAC-like procedure was used to find a list M of m* global models $X_{k,t}$ for which $P(X_{k,t}|D)$ is largest. With these in hand, an approximate optimization for X in Eq. 10 is $$X^* = \underset{X}{\operatorname{argmax}} \sum_{k,t \in \mathcal{M}} \prod_{i=1}^{n} P(\Delta x_{k,t}^i) P(x^i | d^i) \quad (11)$$

where the sum is now only taken over those k,t ∈ M.

To find the best X*, first find an initial estimate $x_0^i$ for each part i as $$x_0^i = \underset{x^i}{\operatorname{argmax}} \sum_{k,t \in \mathcal{M}} P(\Delta x_{k,t}^i) P(x^i | d^i).$$

This is equivalent to solving for $x_0^i$ by setting all $P(\Delta x_{k,t}^i)$ and $P(x^i|d_j)$ to a constant in Eq. 10 for all j≠i. To compute each $x_0^i$, multiply the detector output by a Gaussian function centered at $x_{k,t}^i$, with the covariances calculated as described above. Next, find the image location $x_0^i$ where the sum of the resulting products is maximized. The initial estimates, $x_0^i$, i ∈ 1 . . . n can then be used to initialize an optimization of Eq. 11 to find the final estimates $x^{i*}$ that make up X*. For some uses of the fiducial output, $x_0^i$, i ∈ 1 . . . n may be sufficiently accurate estimates of the fiducial location and further optimization may be unnecessary.

It will be recognized by one of ordinary skill in the art that the method and system for localizing parts of faces can be applied for localizing parts of many other object classes. The method described herein takes as training input a collection of images with marked part locations and then given a new image, the method will find the location of the parts in the new image. Thus, the method could be applied to find face parts of non-humans such as cats, dogs and other animals, as well as parts of inanimate objects, as well as for identification of distinct features within some other image. For example, individual humpback whales are identified by color patterns, notches and scars on their tails, so a parts locator could assist in computer-aided identification of a whale within an image where angle, rotation and other variables may make it difficult to locate the body parts, especially given the short periods of time during which the whales are visible. Rhinoceros in the wild are identified by features such as ear notches, horn characteristics, and tail length and curvature, so the ability to automatically locate these body parts within a photograph of these shy animals would be helpful for conservation studies. In another example, the inventive method may be used to find parts of a bicycle such as the front hub, rear hub, peddles, seat, left handlebar, right handlebar, crank arms, and brake levers. The method would be trained with images of bicycles where the locations of these parts are marked. Local detectors are trained in the same way and the global model can be directly used. The inventive method can be applied to find parts of many other objects of interest for use in various computer vision applications.

EXAMPLES

The present invention focuses on localizing parts in natural face images, taken under a wide range of poses, lighting conditions, and facial expressions, in the presence of occluding objects such as sunglasses or microphones. Existing datasets for evaluating part localization do not contain the range of conditions.

Since researchers have recently reported results on BioID, the results produced by the present invention are compared to prior results on BioID. Like most datasets used to evaluate part localization on face images, BioID contains near-frontal views and less variation in viewing conditions than LFPW.

LFPW consists of 3,000 faces from images downloaded from the web using simple text queries on sites such as google.com, flickr.com, and yahoo.com. The 3,000 faces were detected using a commercial, off-the-shelf (COTS) face detection system. Faces were excluded only if they were incorrectly detected by the COTS detector or if they contained text on the face. Note also that the COTS face detector does not detect faces in or near profile, and so these images are implicitly excluded from the dataset.

To obtain ground truth data, thirty-five fiducial points on each face were labeled by workers on Amazon Mechanical Turk (MTurk), a crowdsourcing Internet marketplace that enables computer programmers to coordinate the use of human intelligence to perform tasks that computers are currently unable to do. The fiducial points are as follows:

left_eyebrow_out
right_eyebrow_out
left_eyebrow_in
right_eyebrow_in
left_eyebrow_center_top
left_eyebrow_center_bottom
right_eyebrow_center_top
right_eyebrow_center_bottom
left_eye_out
right_eye_out
left_eye_in
right_eye_in
left_eye_center_top
left_eye_center_bottom
right_eye_center_top
right_eye_center_bottom
left_eye_pupil
right_eye_pupil
left_nose_out
right_nose_out
nose_center_top
nose_center_bottom
left_mouth_out
right_mouth_out
mouth_center_top_lip_top
mouth_center_toplip_bottom
mouth_center_bottom_lip_top
mouth_center_bottom_lip_bottom
left_ear_top
right_ear_top
left_ear_bottom
right_ear_bottom
left_ear_canal
right_ear_canal
chin Of these third-five points, only twenty-nine were used in the example shown here—the six points associated with the ears were excluded. FIG. 2 illustrates the location of the 29 points. Each point was labeled by three different MTurk workers. The average location was used as ground truth for the fiducial point.

Figure 4:
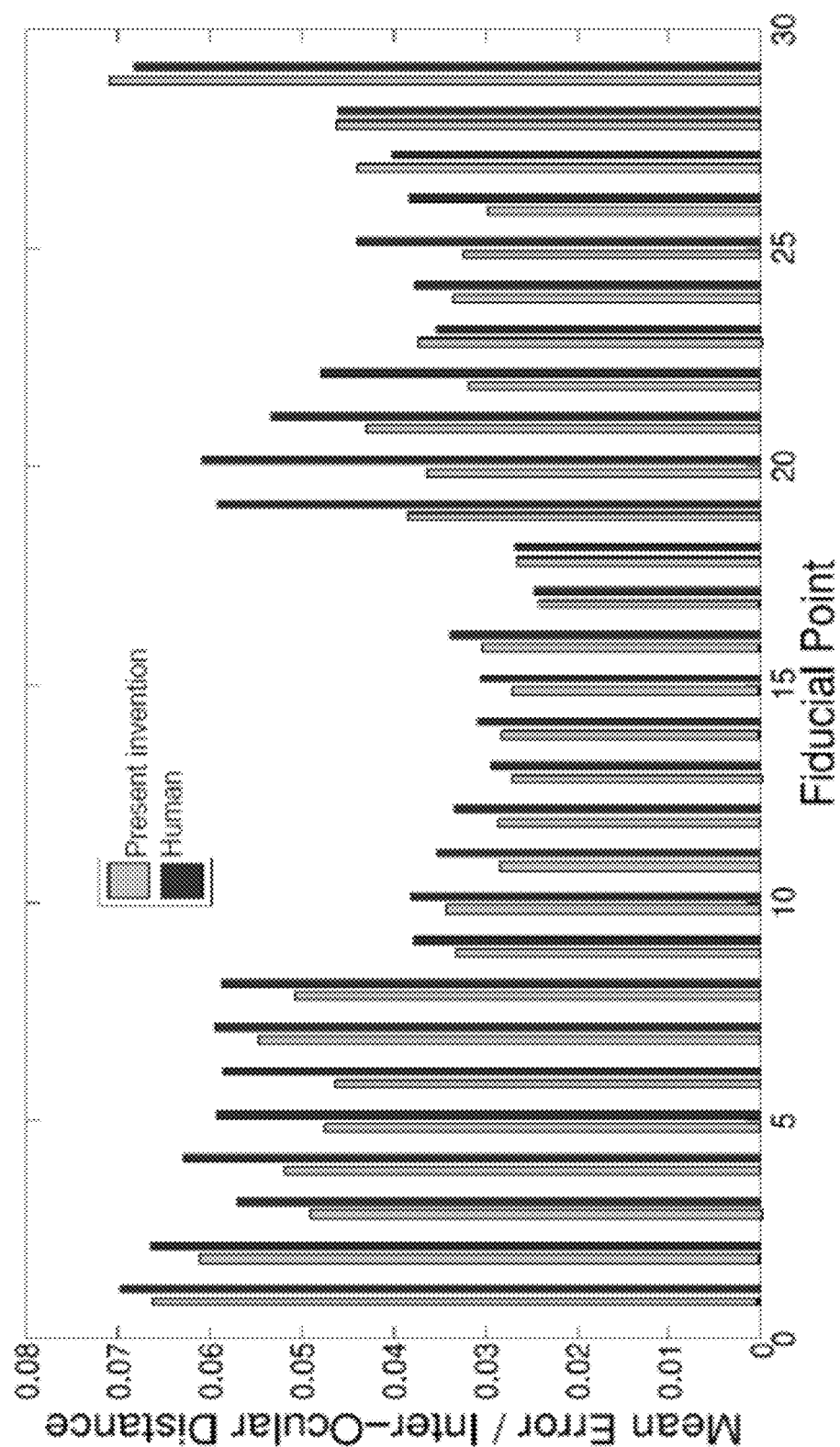
FIG. 4 is a plot showing the mean error of the fiducial detector on the LFPW dataset (gray bar of each pair) compared to the mean variation in human labeling (black bar of each pair) using the fiducial labels shown in FIG. 2. The error is the fraction of inter-ocular distance.

FIG. 6 shows example images from LFPW, along with the results. There is a degree of subjectivity in the way humans label the location of fiducial points in the images, and this is seen in FIG. 4, which shows the variation amongst the MTurk workers. Some parts like the eye corners are more consistently labeled whereas the brows and chin are labeled less accurately.

Figure 7:
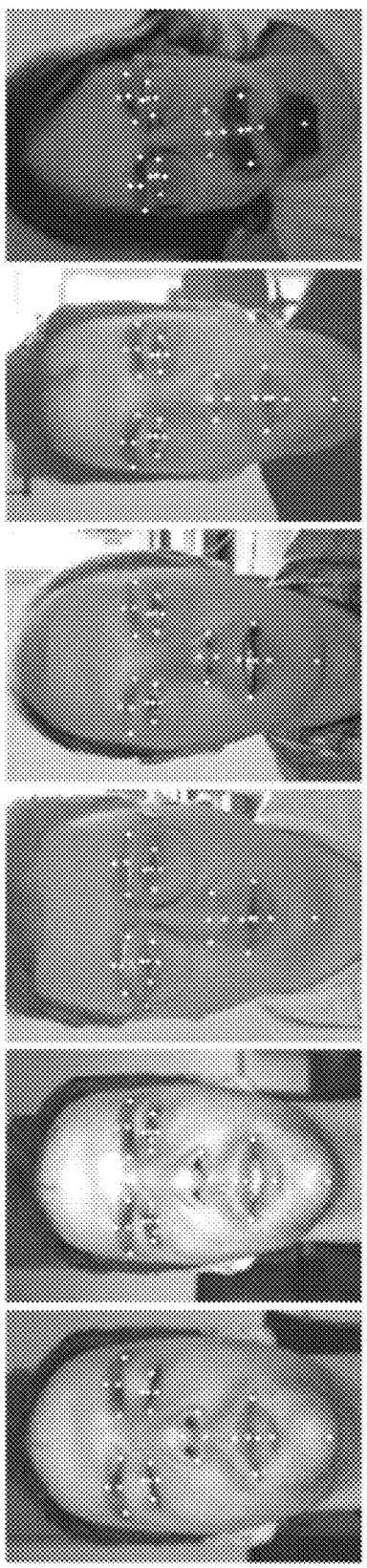
FIG. 7 is a set of images from BioID, with the parts localized by the inventive detector.

The publicly available BioID dataset contains 1,521 images, each showing a frontal view of a face of one of 23 different subjects. Seventeen fiducial points that had been marked for the FGNet project were used, and the $me_{17}$ error measure as defined by Cristinacce and Cootes was used to compare detected locations from ground truth locations. This dataset has been widely used, allowing the results to be benchmarked with prior work. Note that training was performed using the LFPW dataset, and while testing was done using the BioID data. There are considerable differences in the viewing conditions of these two datasets. Furthermore, the locations of parts in LFPW do not always match those of BioID, and so a fixed offset was computed between parts that were defined differently. For example, where the left and right nose points are outside of the nose in LFPW, they are below the nose in BioID). FIG. 7 shows some sample images, along with the results obtain using the inventive method.

The LFPW dataset was randomly split into 1,100 training images and 300 test images. (An additional 1,600 images were held out for subsequent evaluations at future dates.) Training images were used to train the SVM-based fiducial detectors and served as the exemplars for computing the global models $X_k$.

The results of each localization were evaluated by measuring the distance from each localized part to the average of three locations supplied by MTurk workers. Error is measured as a fraction of the inter-ocular distance, to normalize for image size. FIG. 4 shows the resulting error broken down by part. This figure also compares the error in the inventive method to the average distance between points marked by one MTurk worker and the average of the points marked by the other two. As shown, this distance almost always exceeds the distance from points localized by the inventive approach to the average of the points marked by humans. It is worth noting that the eye points (9-18) are the most accurate, the nose and mouth points (19-29) are slightly worse, and the chin and eye brows (1-8, 29) are least accurate. This trend is consistent between human and automatic labeling.

FIGS. 3 and 6 show results on some representative images. To highlight a few characteristics of these results, these images include non-frontal images including viewpoints from below (FIG. 3: Row 1, Col. 2 and FIG. 6: Row 2, Col. 2), difficult lighting (FIG. 6: Row 4, Col. 1), glasses (FIG. 6: Row 1, Col. 5), sunglasses (FIG. 6: Row 2, Col. 4 and FIG. 6: Row 4, Col. 3), partial occlusion (FIG. 6: Row 2, Col. 5 by a pipe and FIG. 6: Row 3, Col. 4 by hair), an artist drawing (FIG. 6: Row 1, Col. 3), theatrical makeup (FIG. 6: Row 2, Col. 1), etc. The localizer requires less than one second per fiducial on an INTEL® Core i7 3.06 GHz machine; most of the time is spent evaluating the local detectors.

Figure 5:
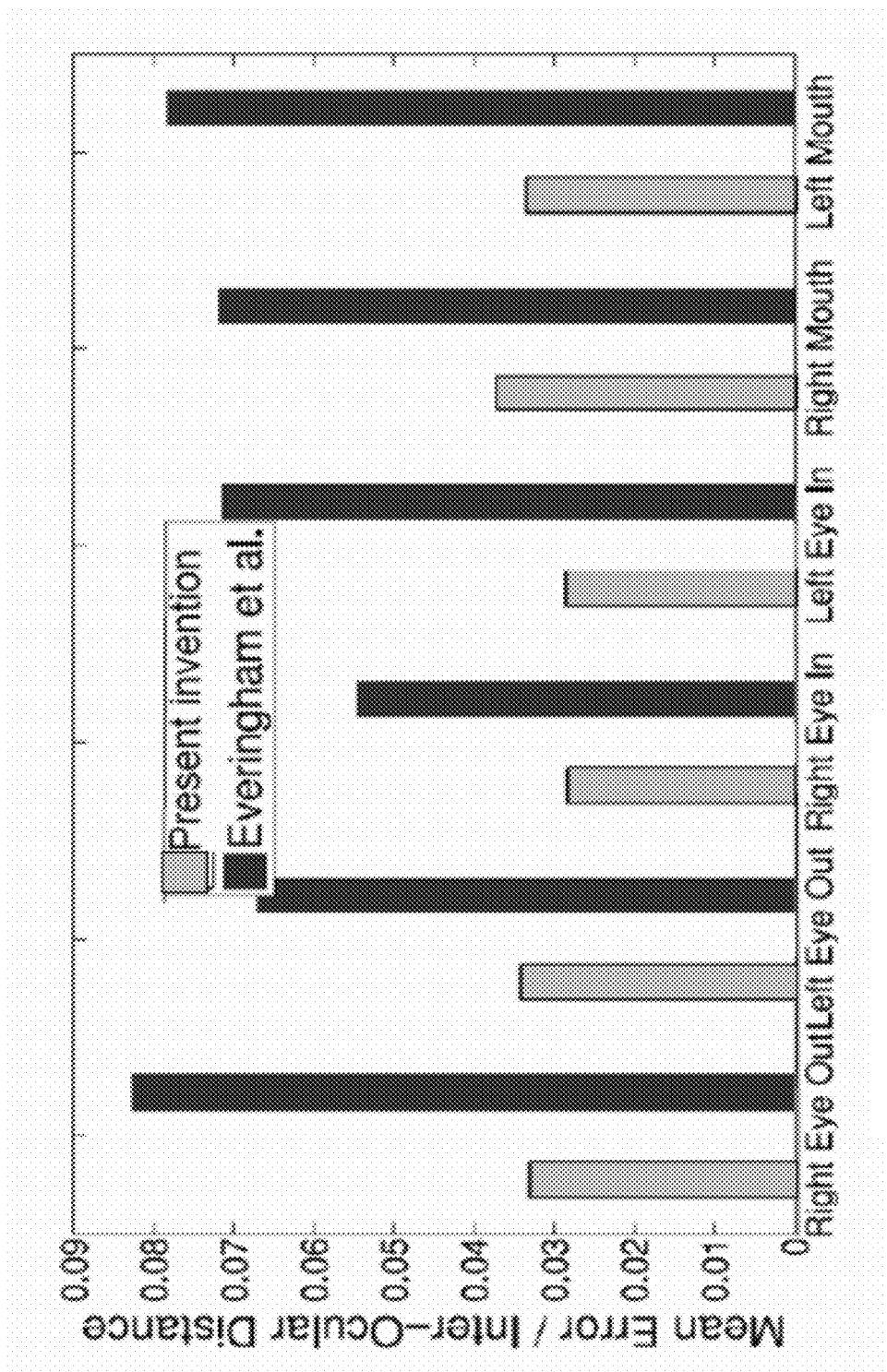
FIG. 5 is a comparison of the performance of the inventive method and the detector of Everingham, et al., showing that the inventive method is roughly twice as accurate as both.

FIG. 5 provides a comparison of the LFPW results from the, inventive method against those of the detector of Everingham et al. At roughly 3% mean error rate, the results for the inventive method are roughly twice as accurate as those of the prior art detector.

FIG. 6 shows a few examples of errors in the inventive system. In Row 1, Cols. 2 and 5, local cues for the chin are indistinct, and the chin is not localized exactly. Row 2, Col. 4 shows an example in which the lower lip is incorrectly localized. This can happen when the mouth is open and a row of teeth are visible. It is believed that these errors can be primarily attributed to the local detectors and should be overcome by employing color-based representations that can more easily distinguish between lips and teeth. In Row 4, Col. 1, the left corner of the left eyebrow is too low, presumably due to occlusion from the hair.

Figure 8:
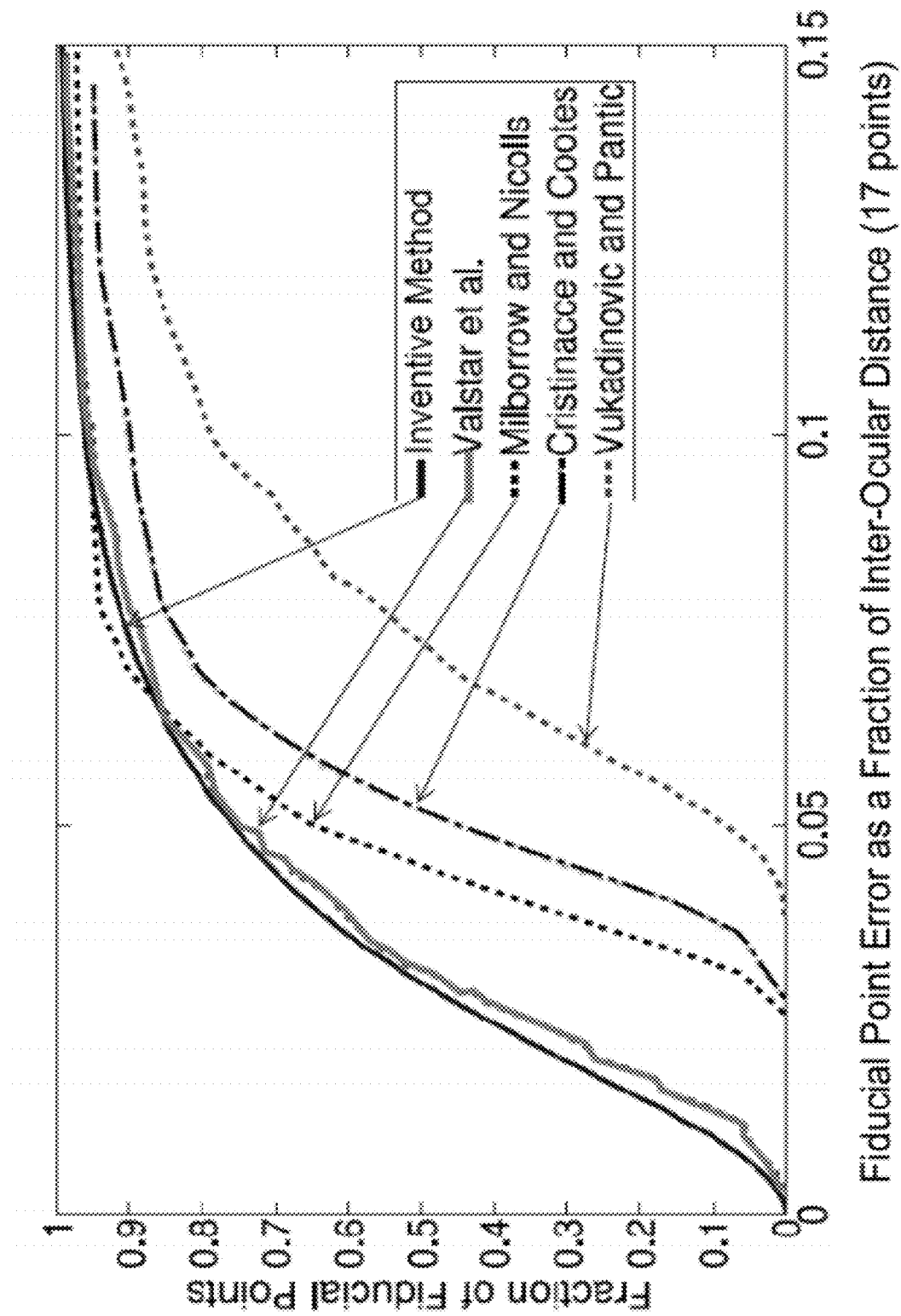
FIG. 8 is a plot of cumulative error distribution comparing the inventive method with methods described by others.

FIG. 7 illustrates results from the application of the inventive part localizer to the BioID faces. Results have been reported on this dataset by a number of authors. FIG. 8 shows the cumulative error distribution of the $me_{17}$ error measure (mean error of 17 fiducials) defined by Cristinacce and Cootes, and compares the results of the inventive method to those reported by Cristinacce and Cootes, Milborrow and Nicolls, Valstar et al., and Vukadinovic and Pantic. The results of the inventive part localizer are similar to, but slightly better than, those of Valstar et al., who have reported the best current results on this dataset. It should be noted that training of the inventive system occurred using a very different dataset (LFPW), and that locations of some fiducials were defined a bit differently.

Figure 9:
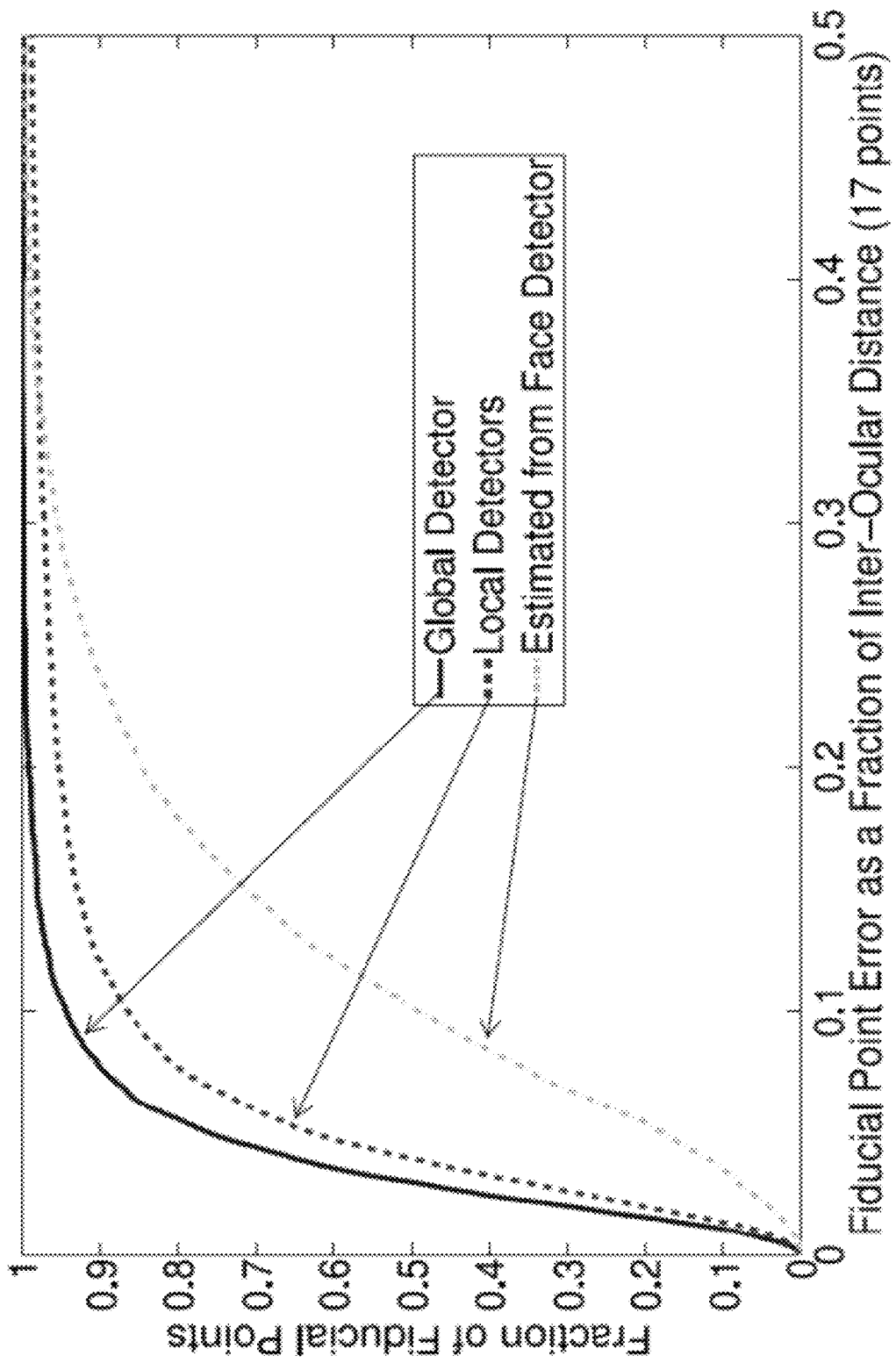
FIG. 9 is a plot of cumulative error distribution of the inventive method on the LFPW dataset compared to locations predicted using the face detector box or found with only the local detectors.

FIG. 9 shows the cumulative error distribution of the $me_{17}$ error measure for the inventive method applied to LFPW. Even though LFPW is a more challenging dataset, the cumulative error distribution curve on LFPW is almost identical to the cumulative error distribution curve on BioID. (Note that the two figures have different scales along the x-axis.) FIG. 9 also shows the cumulative error distribution when only the local detectors are used and when locations are predicted solely from the face box. While the local detectors are effective for most fiducial points, there is a clear benefit from using the consensus of global models. Many of the occluded fiducial points are incorrectly located by the local detectors, as evidenced by the slow climb toward 1.0 of the local detectors curve.

The inventive method provides a new approach to localizing parts in face images. The method utilizes a Bayesian model that combines local detector outputs with a consensus of non-parametric global models for part locations, computed from exemplars. The inventive parts localizer is accurate over a large range of real-world variations in pose, expression, lighting, makeup, and image quality, providing a significant improvement over the limitations of existing approaches.

REFERENCES 1. 1st Intl. Workshop on Parts and Attributes. 2010. 546
2. L. Bourdev and J. Malik. Poselets: body part detectors trained using 3d human pose annotations. In *IEEE Conference on Computer Vision and Pattern Recognition*, page 1365 1372, 2009. 546
3. M. Burl, T. Leung, and P. Perona. Face localization via shape statistics. In *Workshop on Automatic Face and Gesture Recognition*, 1995. 546
4. P. Campadelli, R. Lanzarotti, and G. Lipori. Automatic facial feature extraction for face recognition. In *Face Recognition*. I-Tech Education and Publishing, 2007. 546
5. D. Cristinacce and T. Cootes. Feature detection and tracking with constrained local models. In *BMVC*, pages 929-938, 2006. 546, 549, 550
6. D. Cristinacce, T. Cootes, and I. Scott. A multi-stage approach to facial feature detection. In *BMVC*, pages 231-240, 2004. 546
7. L. Ding and A. M. Martinez. Precise detailed detection of faces and facial features. In *IEEE Computer Vision and Pattern Recognition (CVPR)*, 2008. 546
8. M. Eckhardt, I. Fasel, and J. Movellan. Towards practical facial feature detection. *Int. J. of Pattern Recognition and Artificial Intelligence*, 23(3):379-400, 2009. 546
9. M. Everingham, J. Sivic, and A. Zisserman. "Hello! My name is . . . Buffy"—automatic naming of characters in TV video. In *BMVC*, 2006. 546, 547, 550
10. N. Gourier, D. Hall, and J. L. Crowley. Facial features detection robust to pose, illumination and identity. In *Int. Conf on Systems, Man and Cybernetics*, 2004. 546
11. L. Gu and T. Kanade. A generative shape regularization model for robust face alignment. In *European Conference on Computer Vision (ECCV)*, pages 413-426, 2008. 546
12. E. Holden and R. Owens. Automatic facial point detection. In *Asian Conf. Computer Vision*, pages 731-736, 2002. 546
13. Jesorsky, K. J. Kirchberg, and R. W. Frischholz. Robust face detection using the Hausdorff distance. In *Conf on Audio-and Video-Based Biometric Person Authentication*, pages 90-95. Springer, 2001. 549
14. N. Kumar, A. C. Berg, P. N. Belhumeur, and S. K. Nayar. Attribute and simile classifiers for face verification. In *IEEE International Conference on Computer Vision*, 2009. 546
15. B. Leibe, A. Ettlin, and B. Schiele. Learning semantic object parts for object categorization. *Image and Vision Computing*, 26:15-26, 1998. 546
16. D. Lowe. Distinctive image features from scale-invariant keypoints. *Intl. Journal of Computer Vision*, 2003. 547
17. S. Milborrow and F. Nicolls. Locating facial features with an extended active shape model. In *European Conf on Computer Vision*, pages 504-513, 2008. 546, 550
18. M. Reinders, R. W. C. Koch, and J. Gerbrands. Locating facial features in image sequences using neural networks. In *Conf on Automatic Face and Gesture Recognition*, pages 230-235, 1997. 546
19. J. M. Saragih, S. Lucey, and J. Cohn. Face alignment through subspace constrained mean-shifts. In *International Conference of Computer Vision (ICCV)*, September 2009. 546
20. M. Valstar, B. Martinez, X. Binefa, and M. Pantic. Facial point detection using boosted regression and graph models. In *IEEE Computer Vision and Pattern Recognition (CVPR)*, pages 2729-2736, 2010. 546, 547, 550, 552
21. P. Viola and M. Jones. Robust real-time face detection. *Intl. Journal of Computer Vision*, 57:137-154, 2004. 545, 546
22. D. Vukadinovic and M. Pantic. Fully automatic facial feature point detection using Gabor feature based boosted classifiers. In *Int. Conf on Systems, Man and Cybernetics*, pages 1692-1698, 2005. 546, 547, 550
23. M.-H. Yang, D. J. Kriegman, and N. Ahuja. Detecting faces in images: A survey. *IEEE Trans. on Pattern Analysis and Machine Intelligence*, 24(1):34-58, 2002. 545
24. C. Zhan, W. Li, P. Ogunbona, and F. Safaei. Real-time facial feature point extraction. In *Advances in multimedia information processing*, pages 88-97. Springer-Verlag, 2007. 546

The invention claimed is:

1. A method for localizing parts of an object in an input image, comprising using a computer processor to perform the steps of:

training a plurality of local detectors using a plurality of image exemplars as training images, wherein each image exemplar is labeled with a plurality of fiducial points, and wherein each local detector generates a detector score when applied at a location in a training image corresponding to a likelihood that a desired part is located at the location within the training image;

generating a plurality of non-parametric global models using at least a portion of the plurality of image exemplars, wherein each non-parametric global model $X_{k,t}$ comprises locations of parts in an image exemplar k transformed by a similarity transform t;

receiving data corresponding to the input image;

applying the trained local detectors to the input image to generate detector scores D for the input image;

deriving a Bayesian objective function from the plurality of non-parametric global models $X_{k,t}$ and the detector scores D using an assumption that locations of fiducial points within the input image are represented within its a potentially matching non-parametric global model as hidden variables comprising the image exemplar k and the similarity transform t corresponding to that non-parametric global model;

optimizing the Bayesian objective function to obtain a consensus set of non-parametric global models $X_{k,t}$ for the hidden variables that best fits the detector scores D corresponding to the input image; and using the consensus set, generating an output comprising estimated locations of the fiducial points within the object in the input image.

2. The method of claim 1 wherein the object is a face.

3. The method of claim 1, wherein the step of optimizing the Bayesian objective function comprises generating a plurality of plausible values for the hidden variables by:
selecting a random image exemplar from the plurality of image exemplars;
selecting from within the random image exemplar at least two random fiducial points;
applying a similarity transform to align the at least two random fiducial points with peaks of the detector output;
evaluating a fit of the random image exemplar and similarity transform to the data; and
repeating the steps of selecting a random image exemplar, selecting at least two random fiducial points, applying a similarity transform and evaluating a fit for a plurality of iterations until a desired fit to the data is obtained.

4. The method of claim 1, wherein the plurality of local detectors comprise sliding window detectors.

5. The method of claim 4, wherein the sliding window detectors comprise support vector machines.

6. The method of claim 4, wherein the sliding window detectors use features comprising scale invariant feature transform descriptors.

7. The method of claim 1, wherein generating the output comprises displaying on a monitor or printout the image of the object with markings indicating the fiducial points within the image.

8. The method of claim 1, wherein generating the output comprises storing the output in a memory for further processing by an image recognition system.

9. The method of claim 1, wherein the input image comprises features in addition to the object and further comprising pre-processing the input image to select and extract an area within the input image which contains only the object.

10. A method for localizing parts of an object in an input image, comprising using a computer processor to perform the steps of:
training a plurality of local detectors using at least a portion of a plurality of image exemplars as training images, wherein each image exemplar is labeled with fiducial points corresponding to parts within the image, and wherein each local detector generates a detector score when applied at one location of a plurality of locations of fiducial points in the training images corresponding to a likelihood that a desired part is located at the location within the training image;
generating a non-parametric global model of the plurality of locations of the fiducial points in each of at least a portion of the plurality of image exemplars, wherein the non parametric global model generates part locations as hidden variables corresponding to a specific image exemplar and a similarity transform applied to the specific image exemplar;
receiving data corresponding to the input image;
applying the trained local detectors to the input image to generate detector scores for the input image;
optimizing the probability that the non-parametric global model best fits the detector scores to generate estimated hidden variables for the input image; and
generating from the estimated hidden variables an output comprising estimated locations of the fiducial points within the object in the input image.

11. The method of claim 10 wherein the object is a face.

12. The method of claim 10, wherein the step of optimizing the probability comprises:
deriving a Bayesian objective function using an assumption that locations of fiducial points within the image exemplar are represented within its corresponding non-parametric global model Xk, t as hidden variables k and t; and
optimizing the Bayesian objective function to obtain a consensus set of global models for the hidden variables that best fits the data corresponding to the image.

13. The method of claim 12, wherein the step of optimizing the Bayesian objective function comprises generating a plurality of plausible values for the hidden variables by:
selecting a random image exemplar from the plurality of image exemplars;
selecting from within the random image exemplar at least two random fiducial points;
applying a similarity transform to align the at least two random fiducial points with peaks of the detector output;
evaluating a fit of the random image exemplar and similarity transform to the data; and
repeating the steps of selecting a random image exemplar, selecting at least two random fiducial points, applying a similarity transform and evaluating a fit for a plurality of iterations until a desired fit to the data is obtained.

14. The method of claim 10, wherein the plurality of local detectors comprise sliding window detectors.

15. The method of claim 14, wherein the sliding window detectors comprise support vector machines.

16. The method of claim 14, wherein the sliding window detectors use features comprising scale invariant feature transform descriptors.

17. The method of claim 10, wherein generating the output comprises displaying on a monitor or printout the image of the object with markings indicating the fiducial points within the image.

18. The method of claim 10, wherein generating the output comprises storing the output in a memory for further processing by an image recognition system.

19. The method of claim 12, wherein the consensus set contains only one global model.

20. The method of claim 10, wherein the input image comprises features in addition to the object and further comprising pre-processing the input image to select and extract an area within the input image which contains only the object.

21. A non-transitory computer-readable medium comprising instructions for receiving a plurality of image exemplars, and further comprising instructions for:
training a plurality of local detectors using at least a portion of a plurality of image exemplars as training images, wherein each image exemplar is labeled with fiducial points corresponding to parts within the image, and wherein each local detector generates a detector score when applied at one location of a plurality of locations of fiducial points in the training images corresponding to a likelihood that a desired part is located at the location within the training image;
generating a plurality of non-parametric global models of the fiducial points in each of using at least a portion of the plurality of image exemplars, wherein each non-parametric global model Xk, t comprises locations of parts in an image exemplar k transformed by a similarity transform t;
receiving data corresponding to the input image;
applying the trained local detectors to the input image to generate detector scores D for the input image;
deriving a Bayesian objective function from the plurality of non-parametric global models Xk, t and the detector scores D to determine a probability that the detector scores D fit at least a portion of the non-parametric global models Xk,t;

optimizing the Bayesian objective function over unknowns k and t in the input image to obtain a consensus set of non-parametric global models Xk,t that best fits the detector scores D corresponding to the input image; and using the consensus set, generating an output comprising estimated locations of the fiducial points within the object in the input image.

22. The non-transitory computer readable medium of claim 21, wherein the step of deriving a Bayesian objective function comprises:

using an assumption that locations of fiducial points within the image exemplar are represented within its corresponding global model as hidden variables; and optimizing the Bayesian objective function to obtain a consensus set of global models for the hidden variables that best fits the data corresponding to the image.

23. The non-transitory computer readable medium of claim 22, wherein the consensus set contains only one global model.

24. The non-transitory computer readable medium of claim 22, wherein the step of optimizing the Bayesian objective function comprises generating a plurality of plausible values for the hidden variables by:

selecting a random image exemplar from the plurality of image exemplars;

selecting from within the random image exemplar at least two random fiducial points;

applying a similarity transform to align the at least two random fiducial points with the peaks of the detector output;

evaluating a fit of the random image exemplar and similarity transform to the data; and repeating the steps of selecting a random image exemplar, selecting at least two random fiducial points, applying a similarity transform and evaluating a fit for a plurality of iterations until a desired fit to the data is obtained.

25. The non-transitory computer readable medium of claim 21, wherein the plurality of local detectors comprise sliding window detectors.

26. The non-transitory computer readable medium of claim 25, wherein the sliding window detectors comprise support vector machines.

27. The non-transitory computer readable medium of claim 25, wherein the sliding window detectors use features comprising scale invariant feature transform descriptors.

28. The non-transitory computer readable medium of claim 21, wherein generating the output comprises displaying on a monitor or printout the image of the object with markings indicating the fiducial points within the image.

29. The non-transitory computer readable medium of claim 21, wherein generating the output comprises storing the output in a memory for further processing by an image recognition system.

30. The non-transitory computer readable medium of claim 21, wherein the input image comprises features in addition to the object and further comprising pre-processing the input image to select and extract an area within the input image which contains only the object.

31. The non-transitory computer readable medium of claim 21, wherein the object is a face.

* * * * *